(12) United States Patent
Epskamp et al.

(10) Patent No.: US 11,958,576 B2
(45) Date of Patent: Apr. 16, 2024

(54) AUTOMATED DRAFT SURVEY

(71) Applicant: Technological Resources Pty. Limited, Melbourne (AU)

(72) Inventors: Troy Epskamp, Mount Hawthorn (AU); En-Shan Looi, Bentley (AU); Jonathon Zeelenberg, Duncraig (AU)

(73) Assignee: TECHNOLOGICAL RESOURCES PTY. LIMITED, Melbourne (AU)

( * ) Notice: Subject to any disclaimer, the term of this patent is extended or adjusted under 35 U.S.C. 154(b) by 1227 days.

(21) Appl. No.: 16/603,278

(22) PCT Filed: Mar. 19, 2018

(86) PCT No.: PCT/AU2018/050247
§ 371 (c)(1),
(2) Date: Oct. 7, 2019

(87) PCT Pub. No.: WO2018/184058
PCT Pub. Date: Oct. 11, 2018

(65) Prior Publication Data
US 2020/0148317 A1    May 14, 2020

(30) Foreign Application Priority Data
Apr. 7, 2017    (AU) .............................. 2017901297

(51) Int. Cl.
*B63B 39/12*    (2006.01)
*G01B 11/22*    (2006.01)
(Continued)

(52) U.S. Cl.
CPC .............. *B63B 39/12* (2013.01); *G01B 11/22* (2013.01); *G01C 11/04* (2013.01); *G01C 13/004* (2013.01);
(Continued)

(58) Field of Classification Search
CPC ......... B63B 39/12; B63B 43/18; G01B 11/22; G01C 11/04; G01C 13/004; G01S 19/14; G01S 19/42; G01S 19/53
(Continued)

(56) References Cited

U.S. PATENT DOCUMENTS

| | | | |
|---|---|---|---|
| 7,325,328 B1* | 2/2008 | Morton | B63B 49/00 |
| | | | 702/159 |
| 2005/0188763 A1* | 9/2005 | Krejci | G01C 5/06 |
| | | | 73/865.9 |

(Continued)

FOREIGN PATENT DOCUMENTS

| | | |
|---|---|---|
| CN | 102975826 A | 3/2013 |
| DE | 240715 A1 | 11/1986 |
| KR | 20140033597 A | 3/2014 |
| KR | 20150031510 A | 3/2015 |
| KR | 20150141840 A | 12/2015 |

OTHER PUBLICATIONS

Dec. 15, 2020—(EP) Extended European Search Report—App 18780808.4.
(Continued)

*Primary Examiner* — Aditya S Bhat
(74) *Attorney, Agent, or Firm* — Banner & Witcoff, Ltd.

(57) ABSTRACT

A method of determining the draft of a vessel comprising the steps of: measuring the draft of the vessel using at least one optical imaging device to provide optical draft measurement data; measuring the draft of the vessel using elevation data provided by at least one GNSS or GPS device so as to provide elevation draft measurement data; and using the elevation draft measurement data and the optical draft measurement data to determine the draft of the vessel.

20 Claims, 12 Drawing Sheets

(51) Int. Cl.
   *G01C 11/04*   (2006.01)
   *G01C 13/00*   (2006.01)
   *G01S 19/14*   (2010.01)
   *G01S 19/42*   (2010.01)
   *G01S 19/53*   (2010.01)
   *B63B 43/18*   (2006.01)

(52) U.S. Cl.
   CPC .............. *G01S 19/14* (2013.01); *G01S 19/42* (2013.01); *G01S 19/53* (2013.01); *B63B 43/18* (2013.01)

(58) Field of Classification Search
   USPC ........................................................ 702/174
   See application file for complete search history.

(56) References Cited

U.S. PATENT DOCUMENTS

2007/0073454 A1* 3/2007 Kaji ..................... G05D 1/0206
                                                            701/21
2009/0112510 A1   4/2009 Crane et al.

OTHER PUBLICATIONS

Jun. 6, 2018—International Search Report & Written Opinion for PCT/AU2018/050247.
Jul. 23, 2019—International Preliminary Report on Patentability for PCT/AU2018/050247.
Tsujii, T. et al., "Automatic draft reading based on image processing," Optical Engineering, vol. 55(10), 104104 (Oct. 2016).

* cited by examiner

AUTOMATED DRAFT SURVEY

CROSS-REFERENCE TO RELATED APPLICATIONS

This application is a U.S. National Stage application under 35 U.S.C. § 371 of International Application PCT/AU2018/050247 (published as WO 2018/184058 A1), filed Mar. 19, 2018, which claims the benefit of priority to Australian Application 2017901297, filed Apr. 7, 2017. Benefit of the filing date of each of these prior applications is hereby claimed. Each of these prior applications is hereby incorporated by reference in its entirety.

FIELD OF THE INVENTION

This invention relates to the field of draft surveying of vessels and in particular, though not exclusively, to systems and methods for undertaking automated draft surveys of vessels using optical and GPS/GNSS based measurements of the draft of a vessel tied up at a wharf.

BACKGROUND TO THE INVENTION

The draft of a vessel is the distance from the water line to the bottom of the hull. During loading and unloading of a vessel it is important to monitor the draft of the vessel to ensure it is not overloaded or unstable and that it has sufficient clearance for the ports it must enter or exit during its next voyage.

Manual monitoring of a vessel's draft during loading and unloading is time consuming and may require personnel to measure the draft on the ocean side of the vessel from within a pilot boat or similar vessel.

Loading of bulk carriers and other cargo vessels may be interrupted whilst a draft survey is undertaken. This increases the time required to load the vessel. Automation of draft surveys aims to alleviate some of these issues.

STATEMENTS OF INVENTION

According to a first aspect of the present invention there is provided a method of determining the draft of a vessel comprising the steps of:
  measuring the draft of the vessel using at least one optical imaging device to provide optical draft measurement data;
  measuring the draft of the vessel using elevation data provided by at least one GNSS or GPS device so as to provide elevation draft measurement data; and
  using the elevation draft measurement data and the optical draft measurement data to determine the draft of the vessel.

The method may further comprise using the elevation draft measurement data to validate the optical draft measurement data, which, if validated, determines the draft of the vessel.

The method may comprise the step of capturing at least one optical image of draft marks on a hull of the vessel using the at least one optical imaging device;
  performing optical character recognition (OCR) processing of the optical image to provide OCR data; and
  using the OCR data in the determination of the optical draft measurement data.

The method may comprise the step of measuring the draft of the vessel using at least one optical imaging device;
  measuring a distance between at least one point on a hull of the vessel and the at least one optical imaging device; and
  measuring a relative angle between first and second positions of an optical axis of the optical imaging device, wherein the first position is a predetermined position and the second position is the position of the optical imaging device when the distance between the optical imaging device and the at least one point on the hull is measured.

The method may comprise locating at least one optical imaging device and at least one laser distance measuring device on a pan and tilt platform; and
  operating the laser distance measuring device to measure the distance between the at least one optical imaging device and said at least one point on the hull of the vessel;
  and using the pan and tilt platform to move the optical imaging device to the second position and using said pan tilt platform to measure the relative angle between said first position and said second position.

The first position of the optical imaging device may comprise the optical axis of the optical imaging device being located at an angle substantially perpendicular to a longitudinal axis of a wharf on which, or adjacent to which, said optical imaging device is located; and
  measuring the relative angle between said first position and said second position may comprise measuring the relative angle in a horizontal plane and a vertical plane.

The method may comprise using measurements of:
  i) the distance between the optical imaging device and the hull; and
  ii) the relative angle between the first position and second position,
  to produce a data set of three dimensional data of the location of at least one point on the surface of the hull at least in the vicinity of one set of draft marks.

The method may comprise using:
  i) measurements of the distance between the optical imaging device and the hull; and
  ii) the relative angle between the first position and the second position,
  to determine the width of the hull of the vessel between corresponding draft marks on port and starboard sides of the hull of the vessel.

The method may comprise the step of performing a transformation on at least one image containing at least one set of draft marks; the transformation using the relative angle between the second position in which said image was captured by the optical imaging device and said first position.

The method may comprise the steps of:
  obtaining at least one image containing at least one set of draft marks;
  correcting said image for the relative angle between the second position in which said image was captured by the optical imaging device and said first position so as to produce a corrected image; and
  performing optical character recognition of said corrected image.

The method may comprise the step of:
  transforming said image to appear as if the hull of the vessel is located in a vertical plane whereby all points on the hull of the vessel appear as if they are equidistant from the viewing point of the optical imaging device.

The method may transform the image to appear as if it were taken by an optical imaging device:
i) located at a view point that is:
   a) perpendicular to a longitudinal axis of the wharf against which said vessel is berthed; and
   b) an infinite distance from the hull of the vessel, and
ii) operating with an infinite zoom.

The method may comprise the transform operating to transform the image to appear as if all light rays that form the image are parallel to one another and perpendicular to the plane in which the image is formed.

The light rays may be parallel within both horizontal and vertical planes.

The method may comprise the transformation further transforming the image to appear as if all points on the surface of the hull are equidistant from the view point.

The method may comprise measuring the draft of the vessel using elevation data comprises locating at least one GNSS or GPS device on the vessel so as to measure an elevation of the vessel and thereby obtain elevation data, and using the elevation data to determine the draft of the vessel.

The step of measuring the draft of the vessel using said elevation data may further comprise measuring a tide to provide tide data and using the tide data and the elevation data to determine the draft of the vessel.

The method may comprise the steps of:
positioning at least two GNSS or GPS devices on said vessel at positions laterally displaced relative to a longitudinal axis of said vessel;
measuring elevation data at said at least two GNSS or GSP devices; and
using the elevation data to determine an angle of list of the vessel and thereby provide angle of list data.

The method may comprise the step of using the angle of list data and optical draft data to determine a draft measurement of the vessel for the ocean side of the vessel.

The at least one optical imaging device may be located on a wharf and said method may further comprise the step of berthing said vessel at said wharf before determining said optical draft measurement and said elevation draft measurement.

The at least one optical imaging device may be located in a fixed position on said wharf.

At least two optical imaging devices may be located on said wharf in positions suitable for measuring draft marks at the bow and stern of the vessel.

The method may comprise the step of undertaking multiple measurements of the draft of the vessel during loading or unloading of the vessel so as to provide real time or near real time measurements of the draft of the vessel.

According to a second aspect of the present invention there is provided a system for determining the draft of a vessel, the system comprising:
   at least one optical imaging device located on a wharf, and at least one GNSS or GPS device;
   the system being adapted to operate according to the steps of:
   measuring the draft of the vessel using the at least one optical imaging device to provide optical draft measurement data;
   measuring the draft of the vessel using elevation data provided by the at least one GNSS or GPS device so as to provide an elevation draft measurement data; and
   using the elevation draft measurement data and the optical draft measurement data to determine the draft of the vessel.

The system may be further being adapted to use the elevation draft measurement data to validate the optical draft measurement data, which, if validated, determines the draft of the vessel.

The system may further comprise a data processing unit and said step of measuring the draft of the vessel using at least one optical imaging device may further comprise:
   capturing an optical image of draft marks on a hull of the vessel;
   operating the data processing unit to perform optical character recognition (OCR) processing of the optical image so as to provide OCR data; and
   said data processing unit further processing the OCR data when determining the optical draft measurement data.

The step of measuring the draft of the vessel using at least one optical imaging device may further comprise:
   operating a measuring device to measure a distance between at least one point on the hull of the vessel and the at least one optical imaging device; and
   measuring a relative angle between first and second positions of an optical axis of an optical imaging device, wherein the first position is a predetermined position and the second position is the position of the optical imaging device when the distance between the optical imaging device and the at least one point on the hull is measured.

The system may further comprise a pan tilt platform on which said at least one optical imaging device is mounted and a laser distance measuring device located adjacent said at least one optical imaging device;
and said system may be further adapted:
   to operate the laser distance measuring device to measure a distance between the at least one optical imaging device and at least one point on the hull of the vessel;
   to operate the pan tilt unit to move the optical imaging device between at least a first predetermined position and a second position at which said distance between said optical imaging device and said at least one point on the hull is measured; and
   to operate the pan and tilt platform to measure the relative angle between at least the first predetermined position and the second position.

In the first position the optical axis of the at least one optical imaging device may be substantially perpendicular to a longitudinal axis of a wharf on which, or adjacent to which, the optical imaging device is located; and
the step of measuring the relative angle between the first position and the second position may comprise measuring the relative angle in a horizontal plane and a vertical plane.

The system may be adapted to use at least one measurement of:
   the distance between the optical imaging device and the hull and a corresponding measurement of the relative angle between the first position and the second position at which said distance is measured so as to produce a data set of three dimensional data of the location of at least one point on the surface of the hull of the vessel at least in the vicinity of one set of draft marks.

The system may use the data set of three dimensional data of at least one point on the surface of the hull to determine the width of the hull of the vessel between corresponding draft marks on the port and starboard sides of the hull of the vessel.

The system may perform a transformation of at least one image containing at least one set of draft marks; the transformation using the relative angle between the position of the optical imaging device at which said image was taken and the predetermined first position.

The system may be adapted to operate according to the steps of:
   operating the at least one optical imaging device to obtain at least one image containing at least one set of draft marks on the hull of the vessel; and
   correcting said image for the relative angle between first predetermined position of said optical imaging device and a second position in which said image was captured by said optical imaging device so as to produce at least one corrected image; and
   performing optical character recognition of said at least one corrected image.

The system may be adapted to operate according to the step of:
   transforming said image to appear as if the hull of the vessel is located in a vertical plane whereby all points on the hull of the vessel appear as if they are equidistant from the viewing point of the optical imaging device.

The system may be adapted to transform at least one image:
   i) to appear as if it were taken by an optical imaging device located at a view point that is:
      a) perpendicular to a longitudinal axis of the wharf against which said vessel is berthed; and
      b) an infinite distance from the hull of the vessel, and
   ii) to appear as if said optical imaging device operated with an infinite zoom to capture said at least one image from said view point.

The system may be adapted to transform the image to appear as if all light rays that form the image are parallel to one another and perpendicular to the plane in which the image is formed.

The light rays may be parallel to one another both horizontally and vertically.

The method may comprise the transformation further transforming the image to appear as if all points on the surface of the hull are equidistant from the view point.

Measuring the draft of the vessel using elevation data may comprise locating at least one GNSS or GPS device on the vessel so as to measure an elevation of the vessel to thereby obtain said elevation data, and using the elevation data to determine the elevation draft measurement data.

The step of measuring the draft of the vessel using said elevation data may further comprise measuring a tide in the vicinity of the vessel to provide tide data and using the tide data and the elevation data to determine the elevation draft measurement data.

The system may comprise at least two GNSS or GPS devices, one of which may be located on a port side of said vessel and one of which may be located on a starboard side of said vessel to thereby provide port elevation data and starboard elevation data; and
   the processing device may process the port elevation data and the starboard elevation data to determine an angle of list of the vessel so as to provide angle of list data.

The system may use angle of list data and optical draft data from a wharf side of the vessel to determine draft measurement data for the ocean side of the vessel.

The system may further comprise:
   at least two GNSS or GPS devices located at separate locations spaced apart in a longitudinal direction of the hull to provide the forward elevation data and aft elevation data; and may operate the processing unit so as to process the forward elevation data and the aft elevation data so as to determine an angle of pitch of the vessel.

The at least one optical imaging device may be located on a wharf adapted to berth said vessel.

The optical imaging device may be located in a fixed position on said wharf.

At least two of said optical imaging devices may located on said wharf in positions suitable for measuring draft marks at the bow and stern of a vessel.

The system may be adapted to undertake multiple measurements of the draft of the vessel during loading or unloading so as to provide real time or near real time measurement of the draft of the vessel.

According to a further aspect of the present invention there is provided a method of determining the draft of a vessel using at least one optical imaging device comprising:
   operating the optical imaging device to capture an optical image of draft marks on a hull of the vessel;
   performing optical character recognition (OCR) processing of the optical image to provide OCR data; and
   using the OCR data in the determination of optical draft measurement data for the vessel.

The method may further comprise:
   measuring a distance between at least one point on a hull of the vessel and the at least one optical imaging device; and
   measuring a relative angle between first and second positions of an optical axis of the optical imaging device, wherein the first position is a predetermined position and the second position is the position of the optical imaging device when the distance between the optical imaging device and the at least one point on the hull is measured.

The at least one optical imaging device may be located on a pan and tilt platform and at least one laser distance measuring device may be located adjacent the at least one optical imaging device.

The method may further comprise operating the laser distance measuring device to measure the distance between the at least one optical imaging device and said at least one point on the hull of the vessel;
   and using the pan and tilt platform to move the optical imaging device to the second position and using said pan tilt platform to measure the relative angle between said first position and said second position.

In the first position the optical axis of the optical imaging device may be substantially perpendicular to a longitudinal axis of a wharf on which, or adjacent to which, said optical imaging device is located;
   and measuring the relative angle between said first position and said second position may comprise measuring the relative angle in a horizontal plane and a vertical plane.

The method may further comprise using measurements of:
   i) the distance between the optical imaging device and the hull; and
   ii) the relative angle between the first position and second position,
   to produce a three dimensional data set of the location of at least one point on the surface of the hull at least in the vicinity of one set of draft marks.

The method may further comprise the step of using measurements of:
   i) the distance between the optical imaging device and the hull; and ii) the relative angle between the first position and the second position, to determine the width of the hull of the vessel between corresponding draft marks on port and starboard sides of the hull of the vessel.

The method may further comprise the step of performing a transformation on at least one image containing at least one set of draft marks; the transformation may use the relative angle between the second position in which said image was captured by the optical imaging device and said first position.

The method may further comprise the steps of:
obtaining at least one image containing at least one set of draft marks;
correcting said image for the relative angle between the second position in which said image was captured by the optical imaging device and said first position so as to produce a corrected image; and
performing optical character recognition of said corrected image.

The method may further comprise the step of transforming said image to appear as if the hull of the vessel is located in a vertical plane whereby all points on the hull of the vessel appear as if they are equidistant from the viewing point of the optical imaging device.

The transform may operate to transform the image to appear as if it were taken by an optical imaging device:
i) located at a view point that is:
a) perpendicular to a longitudinal axis of the wharf against which said vessel is berthed' and
b) an infinite distance from the hull of the vessel, and
ii) operating with an infinite zoom.

The transform may operate to transform the image to appear as if all light rays that form the image are parallel to one another and perpendicular to the plane in which the image is formed.

BRIEF DESCRIPTION OF THE DRAWINGS

Embodiments will now be described with reference to the accompanying drawings of which:

FIG. 5c is a schematic representation of the transform undertaken on the image in FIG. 5a;

DESCRIPTION OF SPECIFIC EMBODIMENTS

Embodiments of the present invention provide systems and methods for automating measurements of a vessel's draft when berthed at a wharf for loading or unloading. Such embodiments may provide both optical measurements and global navigation satellite system (GNSS) measurements of a vessel's draft. Measurement results from either of these systems may be used to validate a draft survey measurement by the other system. In one embodiment a GPS or GNSS based system is used to validate the accuracy of, or the likelihood of an error in, a draft survey measurement by an optical system.

Figure 2:
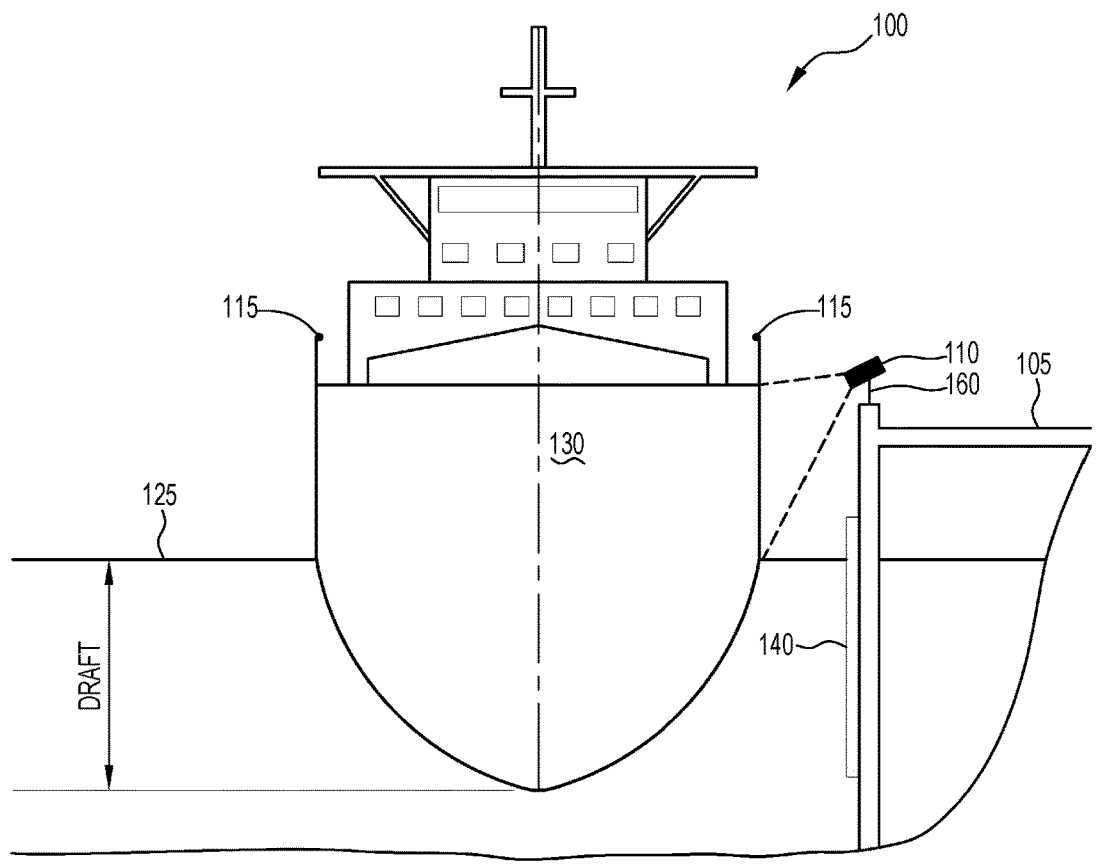
FIG. 2 is a schematic representation in front view of a vessel tied up at a wharf and which shows the draft of the vessel.

A vessel's draft is the distance from the water line to the bottom of the vessel's hull (as depicted in FIG. 2). A vessel's draft typically changes with loading and unloading of the vessel and with changes in ballast.

Figure 3:
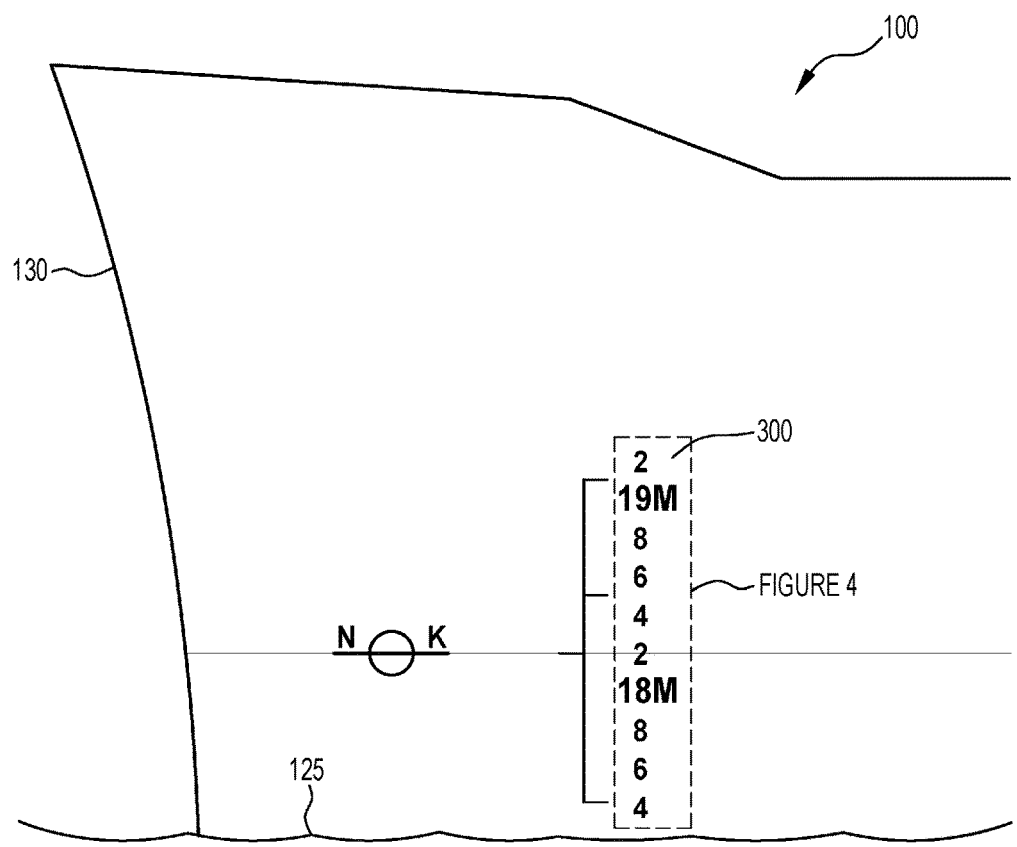
FIG. 3 is a schematic side view of a bow of a vessel tied up at a wharf showing a draft gauge.
Figure 4:
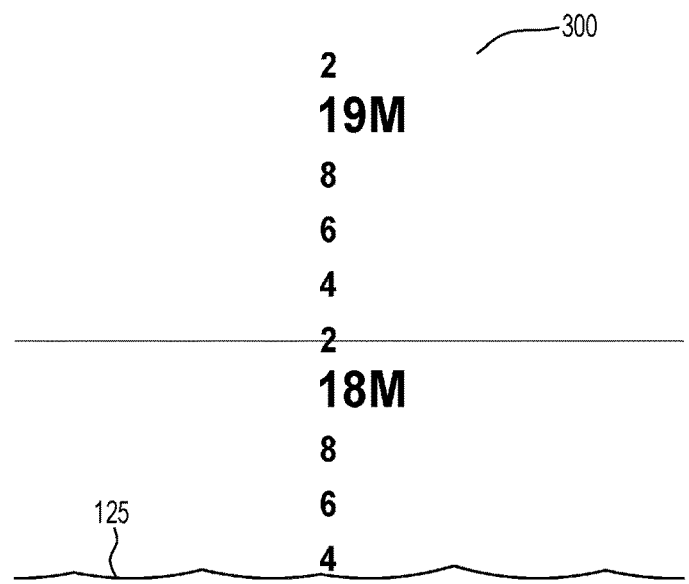
FIG. 4 is schematic front view of the draft gauge in FIG. 3 in greater detail.

Vessel's typically have draft gauges 300 and Plimsoll lines marked on their hull. The draft gauge 300 is a series of numbers painted vertically on the hull, as depicted in FIGS. 3 and 4. The vessel's draft is measured by reading the draft gauge number located at the water line 125. A vessel typically has six draft gauges marked on its hull, two adjacent the bow 130 (one on the port side and one on the starboard side), two adjacent the stern 135 (one on the port side and one on the starboard side), and two at midships (one on the port side and one on the starboard side).

The Plimsoll line is a line that indicates the maximum load for the vessel. There may be several Plimsoll lines on the side of a vessel that are marked to indicate the maximum load for when the vessel is in tropical waters, cold waters and at various different times of the year.

Figure 1:
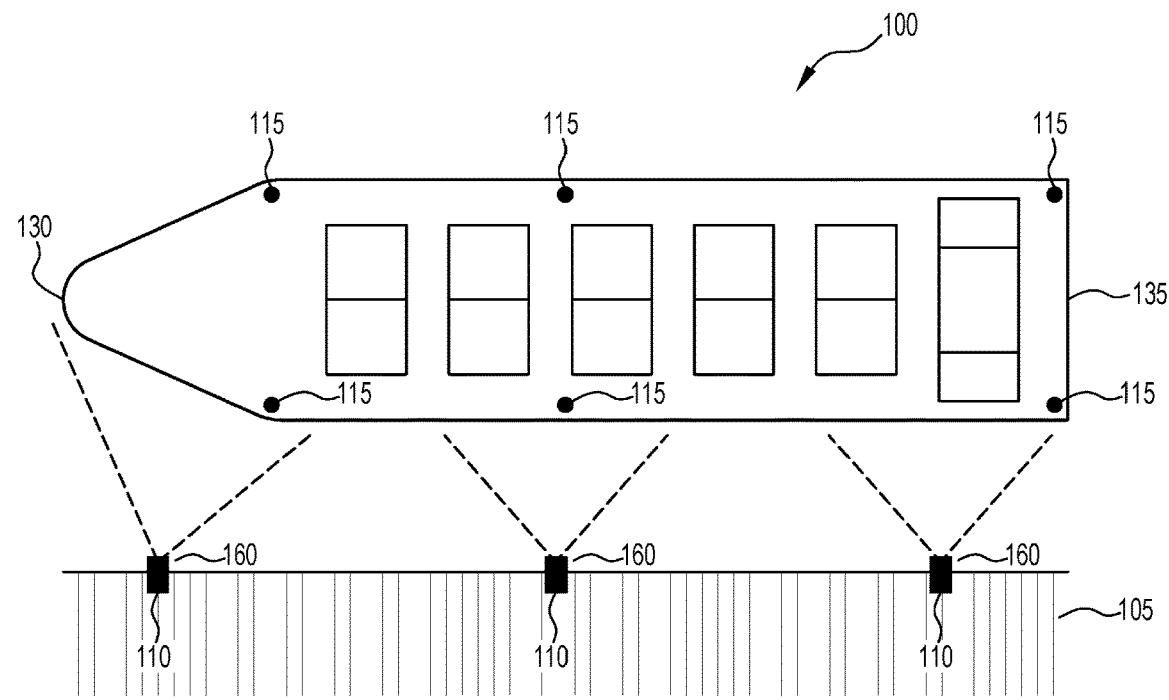
FIG. 1 is a schematic representation in plan view of a vessel tied up at a wharf.

Referring now to FIGS. 1 and 2 there is shown a vessel 100 berthed at a wharf 105. The vessel 100 has six GNSS units 115 located on its upper deck consisting of two adjacent the bow of the vessel 130 (one on the port side and one on the starboard side), two at midships (one on the port side and one on the starboard side), and two adjacent the stern of the vessel 135 (one adjacent the port side and one adjacent the starboard side). The GNSS units 115 are installed when the vessel arrives at port, or upon the vessel berthing at the wharf 105, and operate to communicate GNSS positional data with a control unit 155. The GNSS units are adapted to communicate elevation, latitude and longitude data with the control unit 155 via a wireless network located at the port where the vessel is berthed.

In this embodiment the control unit 155 is located remotely from the wharf 105 and comprises a processor, a memory, an operating system and an automated draft survey program. The control unit 155 may be in communication with a wireless network located at the port.

In the embodiment of FIG. 1, three optical imaging devices 110 are located on wharf 105. The optical imaging devices 110 are located on pan/tilt mounting units 160. The optical imaging devices 110 and the pan/tilt mounting units 160 are in communication with and controlled by control unit 155 and the automated draft survey program. Alternate embodiments have a different number of optical imaging devices 110, such as one or two optical imaging devices.

The optical imaging devices 110 are mounted in a fixed position on the wharf 105, or at the port, or may be moveable relative to the wharf 110 and vessel 100, and may be located manually by an operator adjacent a vessel after it berths, or may be mounted onto tracks or rails which enable the location of the optical imaging devices on the tracks or rails to be controlled by control unit 155.

In an embodiment with three optical imaging devices 110, the optical imaging devices 110 and pan/tilt mountings 160 are located on, or adjacent the wharf 105, adjacent the draft gauge marks on the vessel 300, one at the bow 130, one at midship and one at the stern of the vessel 135.

Control unit 155 operates each optical imaging device 110 and the corresponding pan/tilt mountings 160 so as to capture one or more optical images of a draft gauge 300. These images may be captured as video or as still images but are typically captured as video. The control unit 155 then processes the optical images using image processing software (as further described below), including optical character recognition (OCR) software, to determine the draft gauge mark adjacent the water line 125. This provides an optical based measurement of the draft of the vessel 100 at the relevant location (namely at the bow, the stern or midships), and on the side of the vessel that happens to be adjacent the wharf (port or starboard).

Control unit 155 also obtains GNSS data from the GNSS units 115 and processes this data to determine the draft of the ship at the six draft locations on the hull. To do this the control unit 155 may use latitude, longitude and elevation data from the six GNSS units to fit a surface to the ship about the GNSS units. This surface, in conjunction with tidal data from tidal sensor 140, is used in the calculation of the draft of the vessel. Tidal sensor 140 is typically located at the port or the wharf 105, and provides data in real time, or near real time, as to the relative elevation of the tide. The difference between the relative level of the water line 125 and the elevation of the surface derived from the location of the six GNSS units can be used to determine the height of the surface above the water level adjacent each of the draft gauges. This information can be combined with an initial optical measurement of the vessel's draft to identify the draft of the vessel which corresponds to the particular difference in elevation between the surface and the tide. As the vessel is loaded or unloaded, changes in the elevation of the surface and the tide provides a measure of any change in the draft of the vessel.

As loading or unloading of the vessel progresses, the GNSS based measure of the draft of the vessel may be used to verify subsequent optical measurements of the draft of the vessel. Alternately, the GNSS based measure of the draft of the vessel may be substituted for an optical measurement of the draft of the vessel if an optical measurement cannot be obtained or is deemed to be inaccurate or unreliable.

Figure 6A:
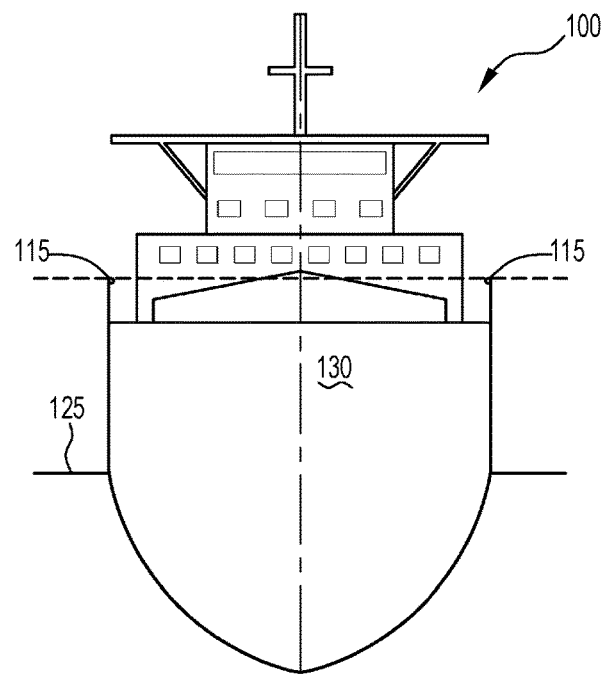
FIG. 6a is a representation of a vessel with no list.
Figure 6B:
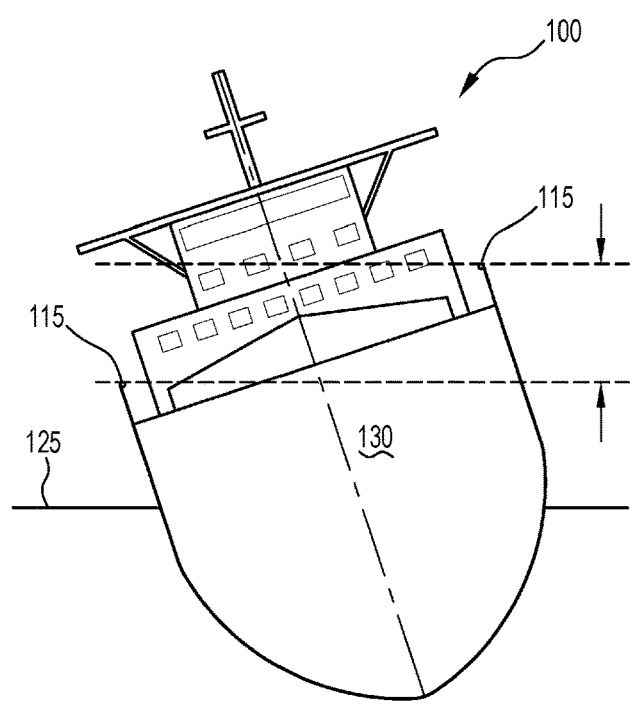
FIG. 6b is a representation of a vessel that is listing.

The control unit 155 may also access the GNSS data to determine the vessel's angle of list. This is initially determined from the difference in elevation between the GNSS units located on the port and starboard sides of the vessel at midships. As depicted in FIGS. 6a and 6b, the difference in elevation between the starboard side and the port side of the vessel may be used to calculate the vessel's list.

Once the difference in elevation between the GNSS units at mid ships is determined, this information may be used to calibrate the difference in elevation between any GNSS units located forward and aft of the vessel. This calibration is required as the deck and/or railing located forward and aft of the vessel may slope. The effect of any slope in the deck or railing is that misalignment of the port and starboard GNSS units will likely provide inaccurate data on the angle of list of the vessel. By correcting any difference in elevation of the port and starboard GNSS units located forward and aft of the vessel, it is possible to use the elevation data from these GNSS units to determine the angle of list of the vessel during loading. This is useful where, for example, one of the GNSS units at mid ships stops working during loading of the vessel.

The angle of list at the bow 130, and the width of the vessel at the waterline adjacent the bow may be used to calculate the draft measurement adjacent the bow 130 on the ocean side of the vessel. This may be repeated for each of the draft gauges on the ocean side of the vessel i.e. the draft gauges adjacent the stern 135 and midships.

The draft of the vessel 100 may be monitored during loading and unloading by repeating the above optical and GNSS based measurements of the draft of the vessel at regular intervals throughout the loading and unloading process. A draft measurement may be obtained at least once every minute during loading or unloading, and preferably more frequently than this, so as to provide real time or near real time measurements of the vessel's draft during loading and/or unloading.

Alternate embodiments locate a distance measuring device, such as a laser based distance measuring device, adjacent the optical imaging device 110 and the pan/tilt unit 160. The laser distance measuring device may be operated in conjunction with pan/tilt unit 160 so as to scan the hull of vessel 100 and generate a data set of the distance from the pan tilt unit 160 of various points on the surface of the hull. This data may be combined with the pan and tilt angle information so that the distance from the pan/tilt unit of various points on the hull, along with the relative angle of these points to a predetermined position of the pan/tilt unit is known. From this information a data set of the three dimensional profile of the surface of the hull may be generated. Any such data set typically has a resolution of at least four scan points per square metre of the hull.

The three dimensional data set of the hull and the relative angle of the scan points on the hull to the predetermined position of pan/tilt unit 160 (and optical imaging device 110) may be used to transform optical images of the draft gauge 300 so that the image may be processed in order to determine the draft of the vessel.

Referring now to FIGS. 3 and 4, there is shown in FIG. 3 a draft gauge 300 located adjacent the bow 130 of vessel 100. The draft gauge consists of metre marks, with 10 cm marks in between. In FIGS. 3 & 4 the 19 metre and 18 metre marks of the draft gauge are visible, with 80 cm, 60 cm, 40 cm and 20 cm marks in between also being visible.

The draft gauge 300 is shown in greater detail in FIG. 4, which shows that the water line 125 intersects with the number "4" (i.e. a 40 cm mark), which is below the 18 metre mark of the draft gauge. A 19 metre mark on the draft gauge may be seen above the 18 metre mark of the draft gauge. The 17 metre mark of the draft gauge cannot be seen as it is below the water line 125. The water line 125 adjacent the number "4" which is below the 18 metre mark indicates that the draft of the hull is 17.4 metres. The line 170 passing through the 18.2 metre mark represents a change in colouring of the vessel hull.

Figure 5A:
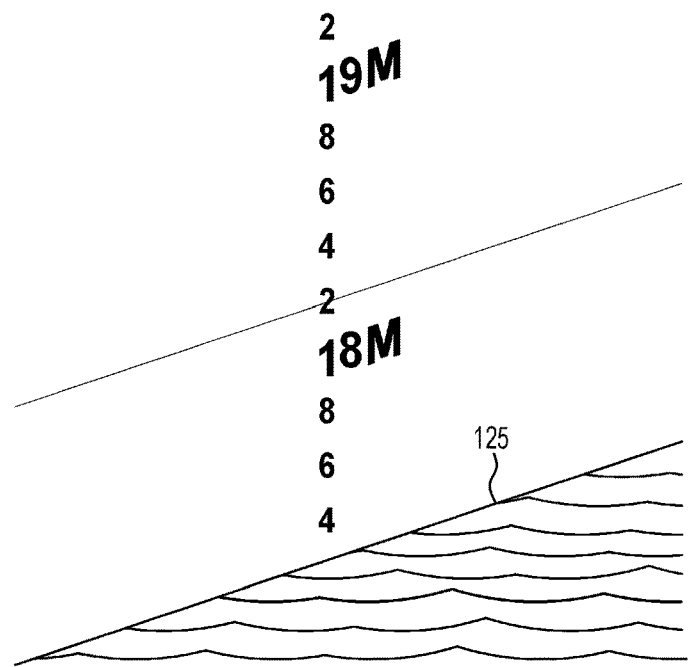
FIG. 5a is a representation of an optical image of the draft gauge of FIG. 3 obtained from an optical imaging device located on a wharf and disposed at an angle to the draft gauge.
Figure 5B:
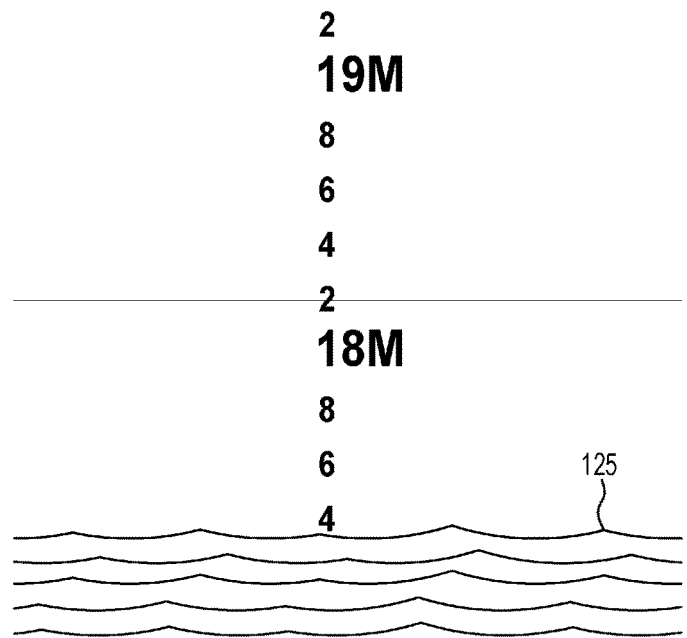
FIG. 5b is a representation of the image of FIG. 5a when corrected for the angle at which the image was obtained.
Figure 5C:
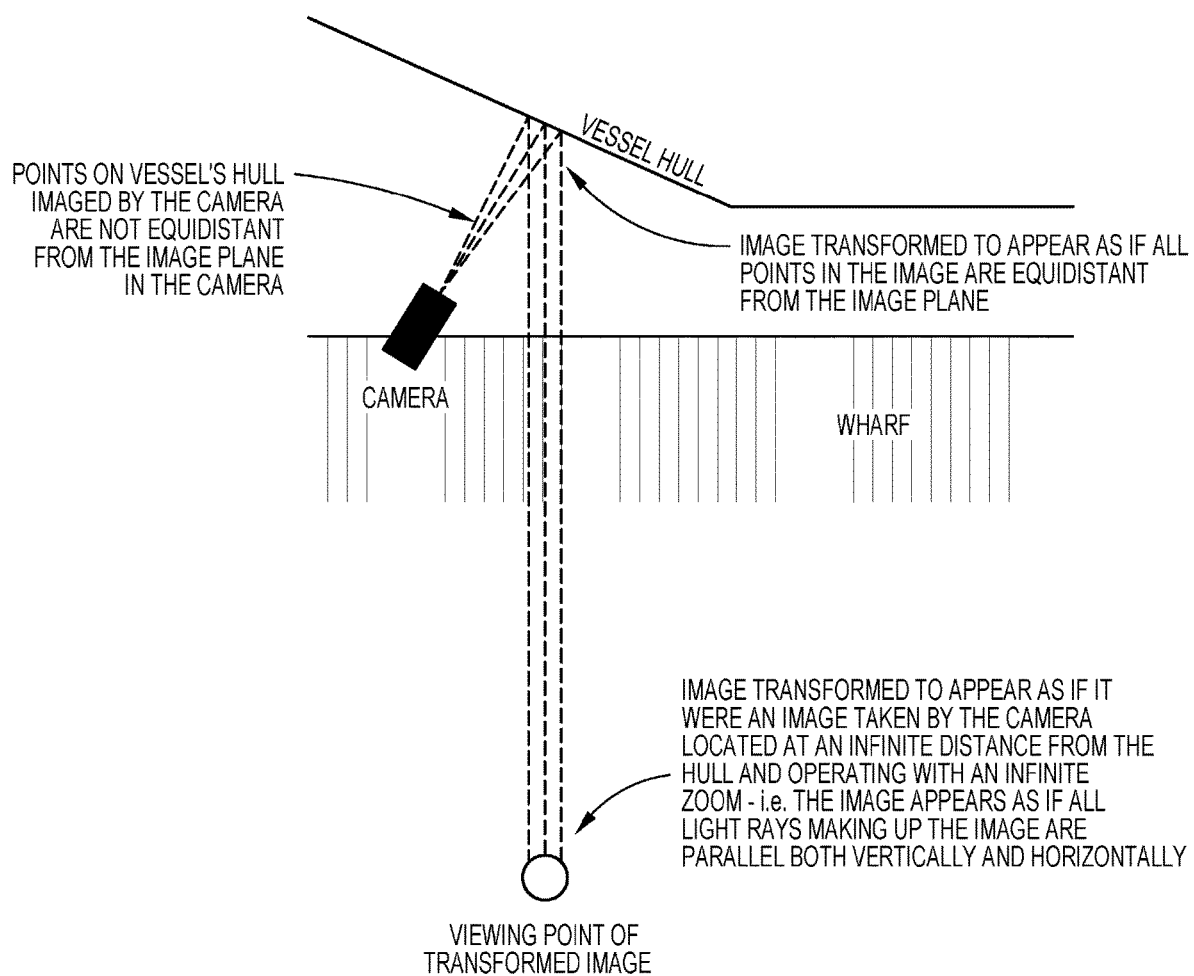

Referring now to FIGS. 5a, 5b and 5c. There is shown in FIG. 5a an image of a draft gauge 300 that has been taken with the optical axis of the optical imaging device 110 positioned at an angle that is not horizontal and that is not perpendicular to the longitudinal axis of the wharf.

FIG. 5*b* shows a transformed image of the draft gauge of FIG. 5*a*. FIG. 5*c* is a schematic representation of the transform that was performed on the image in FIG. 5*a* in order to produce the image in FIG. 5*b*. The image of FIG. 5*a* was taken when the optical imaging device was positioned in Location A, with the optical imaging device in a position with both pan and tilt angles relative to a predetermined position. The transform operates to adjust the image to appear as though the image was taken when optical imaging device 110 was positioned at Location B. The transform operates to produce an image that appears as though it were taken by an optical imaging device positioned at a viewing point that is infinite distance from the hull of the vessel and the optical imaging device having an infinite zoom. In addition, the transform may correct all points in the image to appear as if they were equidistant from the viewing point.

The effect of the transform is that an image is produced as though all light rays from the surface of the hull that make up the image are horizontal and parallel to one another and emanate from points equidistant from the viewing point of the image. The transform improves the reliability of optical character recognition (OCR) processing performed on the numerals that make up the draft gauge and also improves the reliability of determining the water level in the image. The transform may also preserve the relative location of the pixels in the image in a Cartesian space so that the distance from any pixel to the surface of the water can be determined.

In other words, the image correction algorithm operates to make the viewing point of all pixels directly perpendicular to the wharf and parallel to the water surface at a constant distance. This transform enables the draft marks that are painted on the hull to be positioned in the image in a straight vertical line and to be of the same relative size. The water level also ends up substantially horizontal such that the water level can be determined at any point along the water line without the mean water level being higher or lower at different positions along the water line.

Further detail of the methods and systems of the embodiments is now provided. In particular the system may be comprised of various sub-systems including a machine vision sub-system, a GNSS sub-system; a tidal sub-system; a draft estimation sub-system; and a user interface. Each of these sub-systems will now be described in greater detail.

The machine vision sub-system may comprise:
a) a sensor pack located on the wharf adjacent each draft mark (typically 3 positions—Forward, Midships and Aft). Each sensor pack may consist of:
  i. a motorised pan tilt unit (PTU)
  ii. a high definition visual light video camera with motorised zoom mounted on the PTU.
  iii. an accurate laser distance meter (measuring device) mounted on the PTU and aligned with the camera.
  iv. a pencil beam spot light mounted on the PTU and aligned with the camera.
  v. mounting brackets and hardware to attach the sensors to the PTU and the PTU to the wharf.
  vi. equipment to allow remote communications to the sensors.
b) a central computer server executing software and algorithms consisting of:
  i. a computer capable of executing complex machine vision algorithms in parallel.
  ii. sensor pack control software for sending commands to the sensor packs (e.g. to set pan, tilt and zoom) and for receiving video and data from the sensor packs.
  iii. machine vision algorithm software to detect the position of the draft marks and calculate the draft from the sensor pack videos and data.
  iv. a database for storing the results of the machine vision algorithms.

A GNSS sub-system may comprise:
a) mobile RTK-GNSS (Real Time Kinematic-Global Navigation Satellite System) sensors that are mounted on the hand rails of the vessel near each of the sets of draft marks (typically 6 sets of draft marks).
b) a radio network for communicating between a central computer server and the mobile GNSS sensors.
c) a central computer server executing software and algorithms consisting of:
  i. software to communicate with the mobile RTK-GNSS sensors
  ii. mathematical model software to convert GNSS data and tidal data into draft and list values.
  iii. a database for storing configuration data and the results of the mathematical model software A tidal sub-system may comprise a system for measuring the tide level at the port, and/or the wharf, in real-time or near real time. It may provide the measured tide values to the central computer server via a computer system and network.

A draft estimation sub-system may comprise:
a) software which takes draft measurement data from the machine vision sub-system and GNSS sub-system and calculates an estimated draft for the vessel, or relevant draft gauge of the vessel; and
b) a database for storing the resulting estimated drafts.

A user interface sub-system may comprise:
a) a mobile computer (e.g. a tablet) that can be taken on-board the vessel.
b) a web application that operates on the mobile computer and displays in real-time or near real time:
  i. the estimated draft at each draft mark position
  ii. video of the water and draft mark interface at each wharf side draft mark position, preferably both original and transformed video images are displayed.
  iii. information about the current load state of the vessel (e.g. tonnes loaded into each hold).
c) A wireless network to allow the mobile computer to communicate with the web application and the control computer server.

Combining the machine vision sub-system and the GNSS sub-system enables measurements of the draft on both the wharf and ocean sides of the vessel.

Figure 7:
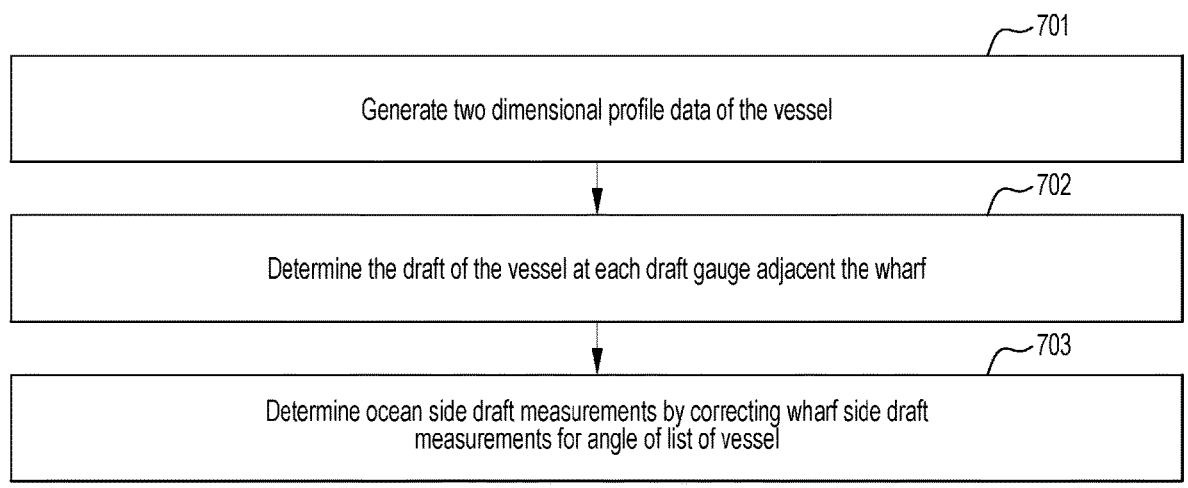
FIG. 7 illustrates a process for determining the draft of a vessel using optical measurements.

Referring now to FIG. 7 there is illustrated a process for determining the draft of the vessel on the wharf and oceans sides using optical draft measurement data and GNSS draft measurement data. In particular:

at step 701, a two dimensional data set of vessel width versus draft at each set of draft marks is generated from measurement results of the hull taken by the machine vision sub-system;

at step 702, the wharf side drafts are measured optically by the machine vision sub-system; and at step 703, the ocean side drafts are determined by correcting the wharf side drafts for the vessel's list measured by the GNSS sub-system and the distance between the draft marks on either side of the vessel at the water level.

Figure 8:
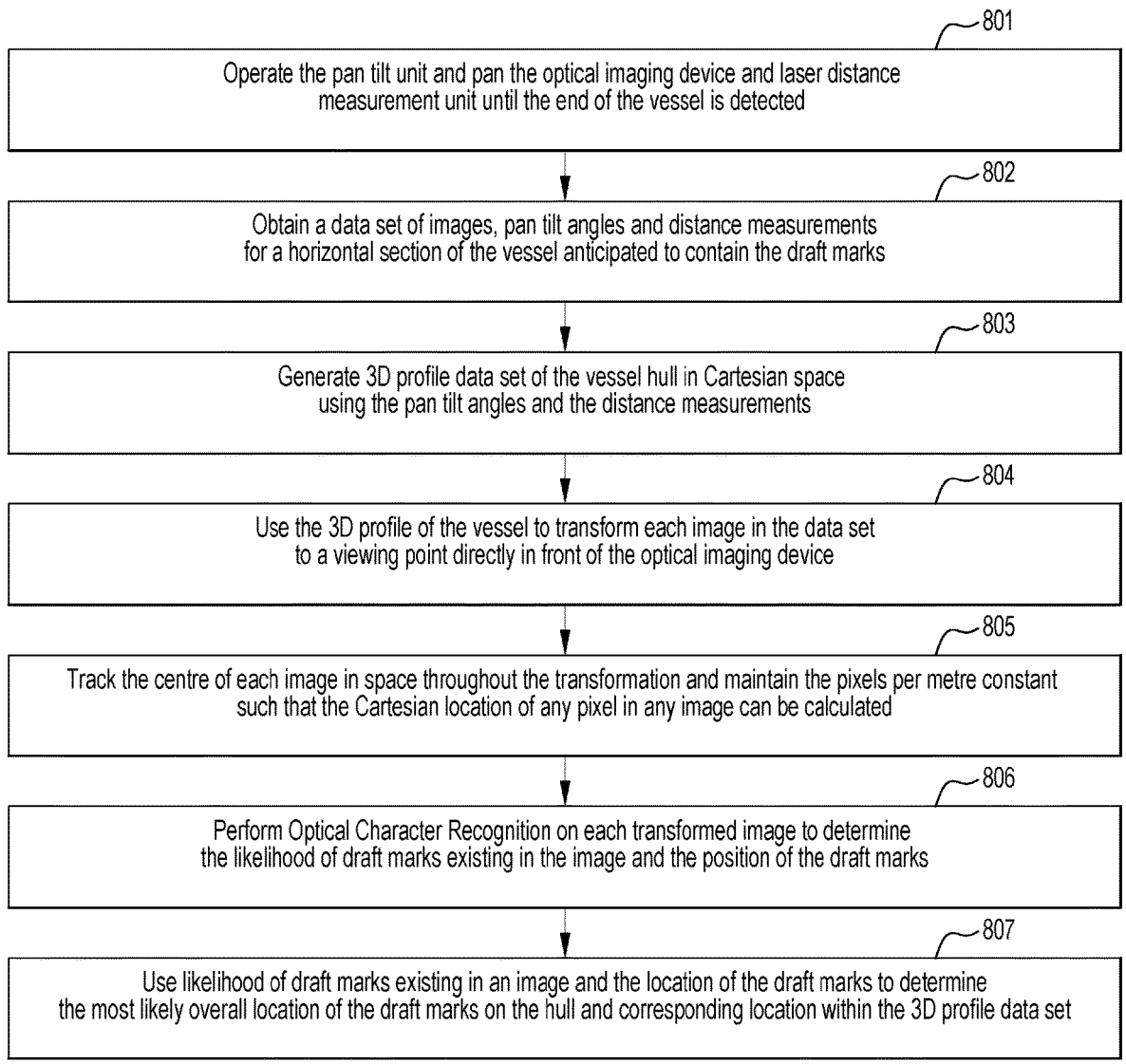
FIG. 8 illustrates a process for automatically detecting the position of draft marks on a hull.

Automatic detection of the position of the draft marks on the hull may be provided in the machine vision subsystem so as to avoid or minimise the need for an operator to physically position or remotely control the pan, tilt unit 160 or the zoom of the optical imaging device:

Referring now to FIG. 8 there is illustrated a process for the machine vision sub-system to automatically detect the position of the draft marks on the hull. In particular:

at step 801, the sensor pack (namely the optical imaging device 110, the pan tilt unit 160 and the laser distance measurement device) is panned to detect the end of the vessel;

at step 802, a dataset of images, pan tilt angles and distance measurements are gathered for a horizontal section of the vessel 100 anticipated to contain the draft marks 300 and the water line 125;

at step 803, the pan tilt angles and distance measurements are converted into a 3D profile of the vessel hull in a Cartesian space;

at step 804, each of the images in the dataset is transformed to a viewing point directly in front (equal to a camera with infinite zoom, which is infinite distance from the vessel, perpendicular to the length of the wharf and horizontally level) using the 3D profile of the vessel hull (referred to above);

at step 805, the centre of the image in space is tracked throughout the transformation and the pixels per metre are kept constant such that the Cartesian location of any pixel in any image can be calculated;

at step 806, an Optical Character Recognition (OCR) algorithm is performed on the transformed images to determine the likelihood of draft marks existing in the image and position of the draft marks in each image; and at step 807, an algorithm takes the likelihood of draft marks existing and position of the draft marks in all of the images to calculate the most likely overall location of the draft marks on the 3D surface of the hull.

The transformation of the images is to cause the images to appear as if they were taken from a viewing point directly in front of the draft marks. The transform may also stabilise the position of the draft marks within the resultant image or within consecutive images. This is for easier human readability of the images and so that a machine vision algorithm can be used to determine the draft measurement independent of the angle of the optical imaging device 110 to the draft marks and the shape of the vessel's hull.

Figure 9:
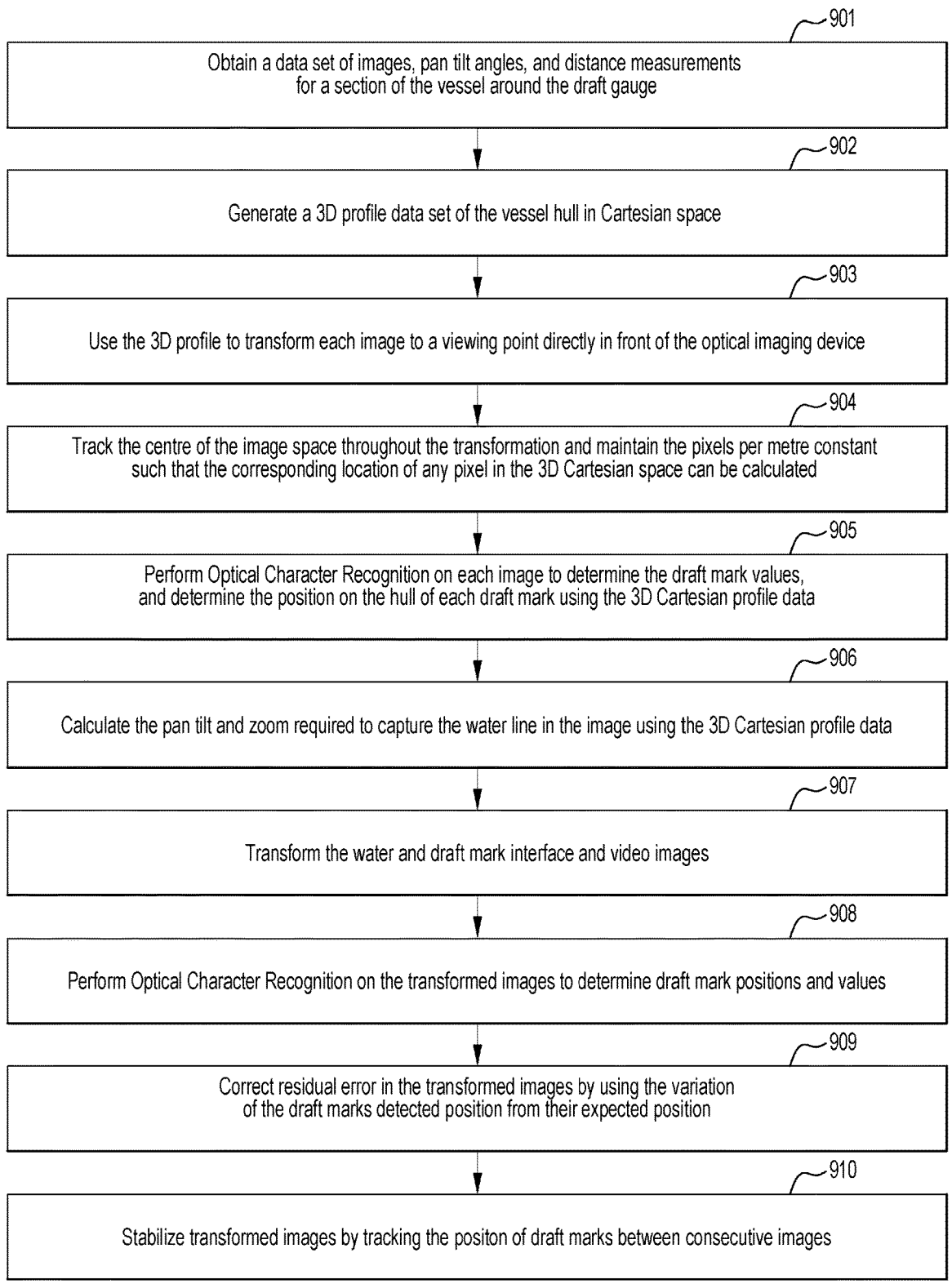
FIG. 9 illustrates a process for correcting an image of a draft mark so that the draft of a vessel may be determined.

Referring now to FIG. 9 there is illustrated a process for correcting an image of the hull. In particular:

at step 901, a dataset of images, pan and tilt angles and distance measurements are gathered for a section of the vessel around the draft marks. The most likely overall location of the draft marks calculated previously is used as the starting point;

at step 902, the pan and tilt angles and distance measurements are converted into a 3D profile of the vessel hull in a Cartesian space;

at step 903, each of the images in the dataset is transformed to a viewing point directly in front of the optical imaging device 115 (equal to a camera with infinite zoom, which is infinite distance from the vessel, perpendicular to the length of the wharf and horizontally level) using the 3D profile of the hull referred to above;

at step 904, the centre of the image in space is tracked throughout the transformation and the pixels per metre are kept constant such that the Cartesian location of any pixel in any image can be easily calculated;

at step 905, an Optical Character Recognition (OCR) algorithm is performed on the transformed images to determine the draft mark positions and values. The location of the draft marks with respect to the 3D profile of the hull is recorded;

at step 906, the pan, tilt and zoom required to correctly capture the water line 125 in the images is calculated using the 3D profile, current tide and last estimate of draft;

at step 907, the water and draft mark interface video images (i.e. the waterline 125 video images) are transformed to a viewing point directly in front of the camera 110 using the 3D profile of the hull;

at step 908, an Optical Character Recognition (OCR) algorithm is performed on the transformed images to determine the draft mark positions and values;

at step 909, any residual error in the transform is corrected by using the variation of the draft marks detected position to the expected position; and at step 910, the position of the draft marks is tracked between consecutive images to allow the transformed images to be stabilised (i.e. such that the draft mark position in images does not move as the vessel moves in the sea).

Further details on the image transformation in Step 903 are described in the following steps 903a-903d:

903a) Create a grid of points in Cartesian space along an X axis (horizontal wharf) and a Z axis (vertical), such that the grid is slightly larger than the field of view (in metres) of the original image centred at the Cartesian centre of the original image.

903b) Calculate the values of points along a Y axis (horizontal and perpendicular to the leading edge of the wharf) for the grid points generated in step 903a) using the 3D profile generated in step 902 to thereby create a set of 3D points. A fitted multi-dimensional polynomial is used as the 3D profile.

903c) The 3D points in step 903b) are transformed into a set of 2D points using standard 3D to 2D projection where the distance to the viewer uses the distance from the camera to the image (based on laser data) and the angles of rotation use the angles of the camera to the horizontal and perpendicular relative to the leading edge of the wharf.

903d) A set of fixed 2D points in units of pixels is calculated using the points generated in step 903a) and using the pixels per metre of the image (which is known because the field of view angle of the camera is known, and the distance to the various points on the hull of the ship from the camera is known). The fixed 2D points represent a point in the transformed image.

Further details on the pixel tracking specified in Step 904 are described in the following steps 904a-904g.

904a) A set of moving 2D points in units of pixels is calculated using the 2D points calculated in 903d). The moving 2D points represent where the fixed points would be in the original image.

904b) Two multidimensional polynomials are generated that map from the moving points to the fixed points. One for horizontal pixel positions and one for vertical pixel positions.

904c) The polynomials from 904b) are used to create two 2D arrays (one for horizontal pixel positions and one for vertical pixel positions) that map from the transformed image to the original image. E.g. say the values at position (1,1) for the two arrays were (23, 45), then the pixel to put at (1,1) in the transformed image is (23,45) in the original image.

904d) The mapping arrays created in 904c) are used to determine where the centre pixel in the original image would be in the transformed image.

904e) The position of the original image centre pixel in the transformed image from 904d) is used as the centre point for repeating step 904c) so that the centre of the original image is in the centre of the transformed image. This is so that the (X, Z) Cartesian co-ordinates of any pixel in the transformed image can be determined based on its distance to the centre of the image and the pixels per metre scaling used in steps 903d) and 904b).

904f) The mapping arrays created in 904e are then used with an image of all 1's. This is to create a mask image that has 1's where there is a pixel in the original image for the transformed image and 0's where there is no corresponding pixel. There can be pixels in the transform image that are beyond the boundaries of the original image. This mask is used to make sure that parts of the transformed image that have no corresponding part in the original image are ignored by the rest of the machine vision algorithms.

904g) The mapping arrays created in 904e) are then used to create the transformed image from the original image.

Draft mark values may be determined by choosing the sequence of marks with the highest sum of likelihoods that each draft mark in the sequence is the value identified according to its position in the sequence; and based on the known pattern of the draft marks. This allows draft mark values to be correctly determined even when some draft mark values are not individually human readable.

Figure 10:
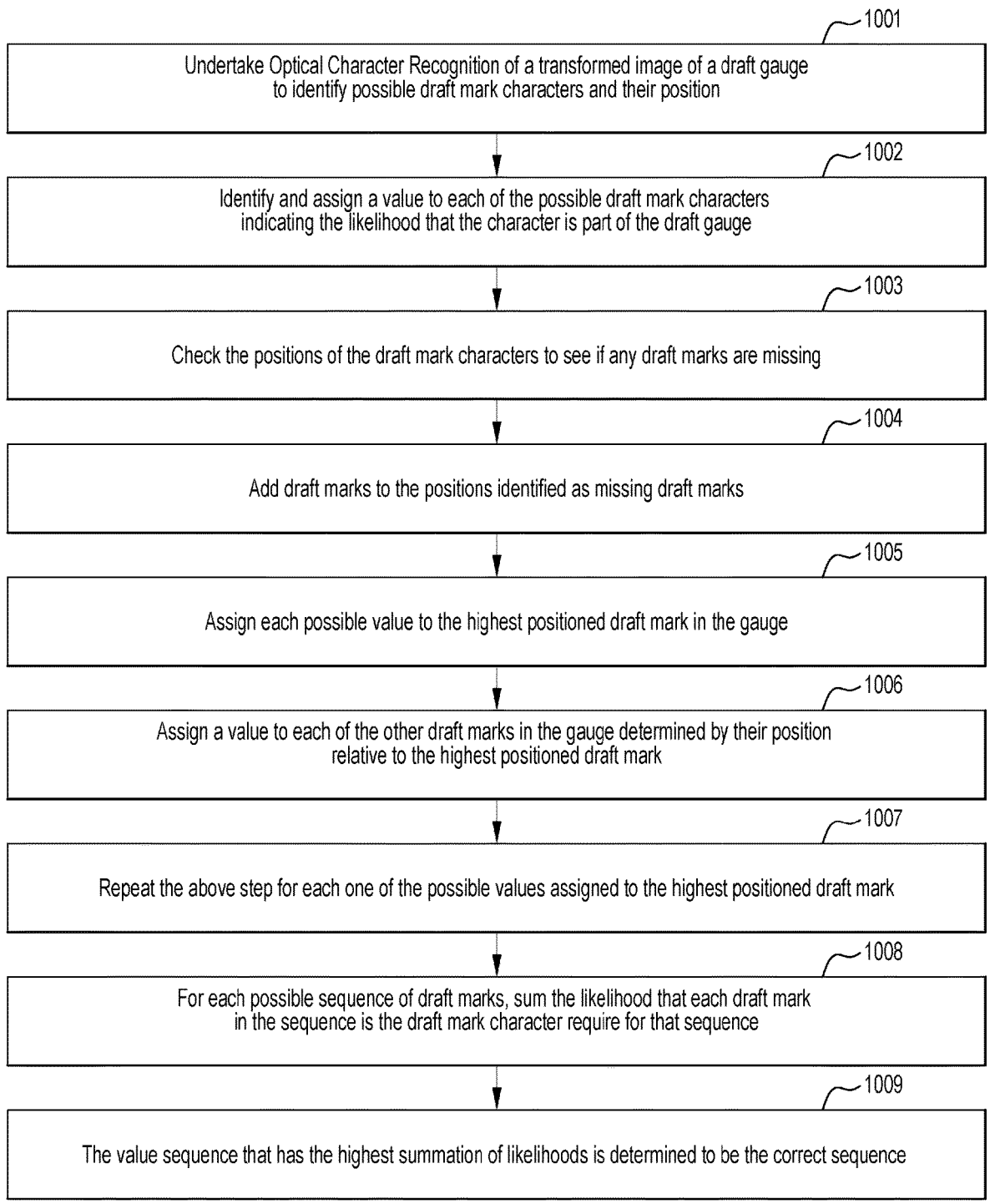
FIG. 10 illustrates a process for determining the draft mark of a draft gauge that is adjacent the water line of the vessel.

Referring now to FIG. 10 there is illustrated a process for determining the draft mark value at the water line of the vessel. In particular:

at step 1001, an OCR algorithm is used to identify possible draft mark characters within an image and to identify their position within the image;

at step 1002 identify and assign a value to each of the possible draft mark characters indicating the likelihood that it is part of the draft gauge;

at step 1003, the positions of the identified draft marks are checked to see if any draft marks are missing;

at step 1004 missing draft marks are added to the positions identified as missing a draft mark;

at step 1005, the highest positioned draft mark on the hull in the image is given each possible value;

at step 1006, assign a value to each of the other draft marks in the gauge determined by its position relative to the highest positioned draft mark.

at step 1007, repeat step 1006 for each one of the possible values assigned to the highest positioned draft mark;

at step 1008, for each possible sequence of draft marks, sum the likelihood that each draft mark is the draft mark character required for that sequence; and at step 1009, the value sequence that has the highest summation of likelihoods is determined to be the correct sequence.

This algorithm is applied to determining the 10 cm marks as well as the metre marks.

For the metre marks the process of FIG. 10 can be applied across images at different pan tilt angles thus allowing for the correct metre mark values to be determined at the water and draft mark interface (water level 125) even if the metre marks are not individually human readable at the water and draft mark interface. This is only possible due to the Cartesian location of each metre mark being identifiable via methods described above.

Further detail on steps 1001 and 1002 in the process specified for determining the draft mark values at the water level are now provided.

In relation to step 1001:

1001a) A convolution edge filter is applied to the transformed image. This creates a grey scale image where any edges in the transformed image will have higher numerical values.

1001b) A convolution filter, with templates of different draft mark numbers as the kernel, is applied to the image created in step 1001a). These templates are examples of what well formed draft marks would look like if the convolution edge filter was applied to them. These templates are scaled to various sizes (smaller, same and larger) of the expected draft mark size. The output of this step is a set of "images" with values that are equal to how well that area of the edge image matches the template.

1001c) A local maxima algorithm is applied to the output of step 1001b), which outputs the maximum values and position of those maximum values of the output of step 1001b) in small (draft mark size) areas.

1001d) A list of possible draft marks is generated based on the convolution outputs generated in step 1001c).

In relation to step 1002:

The list of possible draft marks from step 1001d) is searched to find all overlapping draft marks. Overlapping draft marks are combined into a single draft mark in the list which will have a different score or "likelihood" for each possible numerical value. E.g. if a "2" with a score of 0.3, another "2" with a score of 0.15 and "4" with a score of 0.8 were overlapping, they would be combined into a single draft mark with a score of 0.3 for a value of 2 and a score of 0.8 for 4.

The vessel's draft may be determined by two different methods. In the first method, the vessel's draft is determined by combining OCR data from video images containing draft marks with distance measurements and accurate tidal measurements. This method does not require the water level to be detected in the images (this method is referred to as the OLT method—OCR, Laser distance and Tide).

Figure 11:
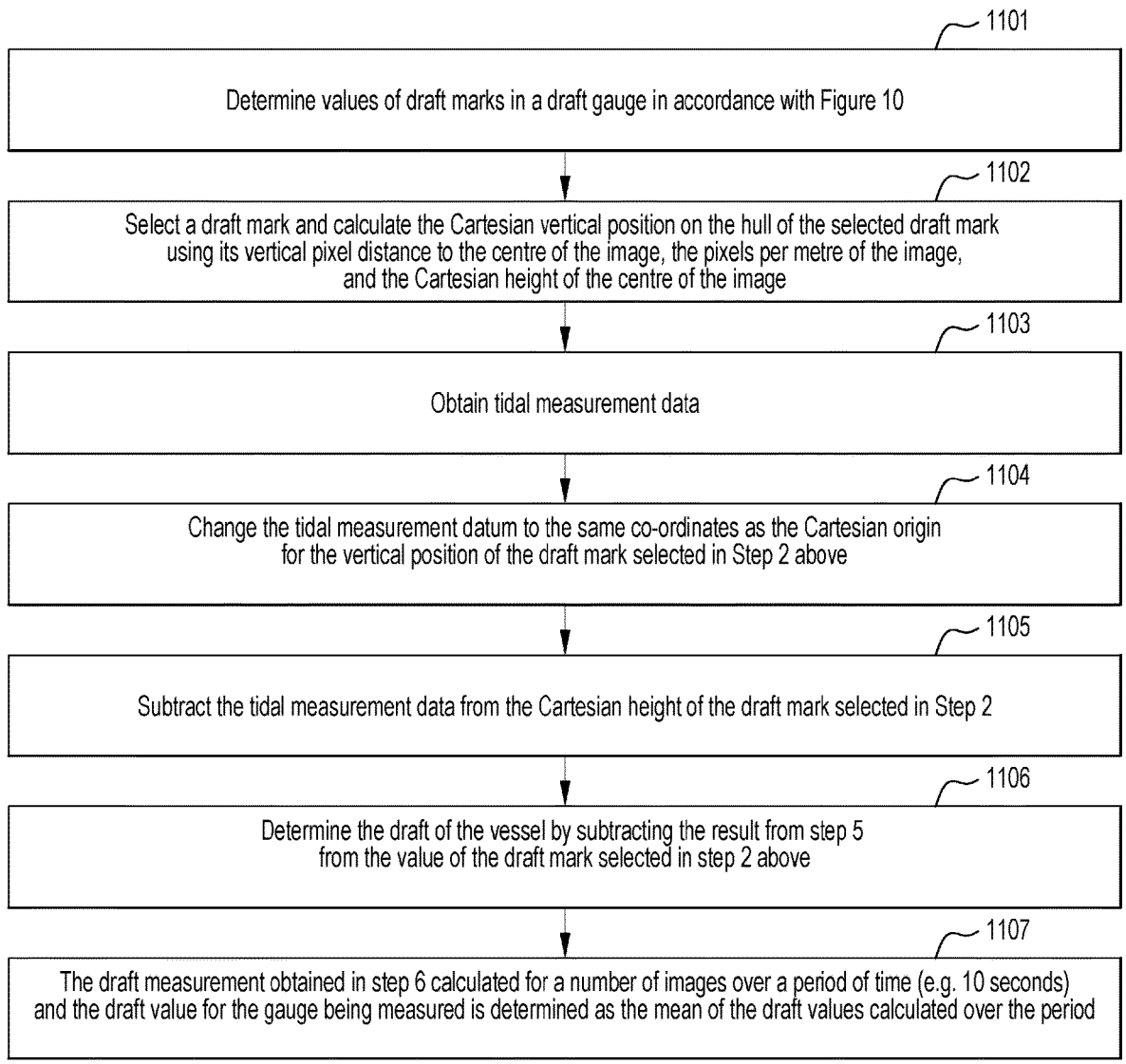
FIG. 11 illustrates an optical, laser and tidal (OLT) based method for determining the draft of a vessel.

Referring now to FIG. 11 the OLT method of determining the draft of a vessel is illustrated in greater detail. In particular:

at step 1101, the images from videos of the draft marks are transformed and OCR algorithms applied as defined above such that the position and value of the draft marks are detected and there is constant pixels per metre across the image, and the location of the centre of the image in Cartesian space is known;

at step 1102, select a draft mark and calculate the Cartesian vertical position of the selected draft mark using its vertical pixel distance to the centre of the image, the pixels per metre of the image, and the Cartesian height of the centre of the image;

at step 1103, obtain tidal measurement data

At step 1104, change the tidal measurement datum to the same co-ordinates as the Cartesian origin for the vertical position of the draft mark selected at step 2 above;

at step 1105, subtract the tidal measurement from the Cartesian height of the draft mark selected at step 1102;

at step 1106 determine the draft of the vessel by subtracting the result from the calculation in step 1105 from the draft value of the draft mark selected in step 2; and at step 1107, the draft measurement obtained in step 1106 is calculated for a number of images over a period of time (e.g. 10 seconds) and the draft value for the gauge being measured is determined as the mean of the draft values calculated over the period.

Figure 12:
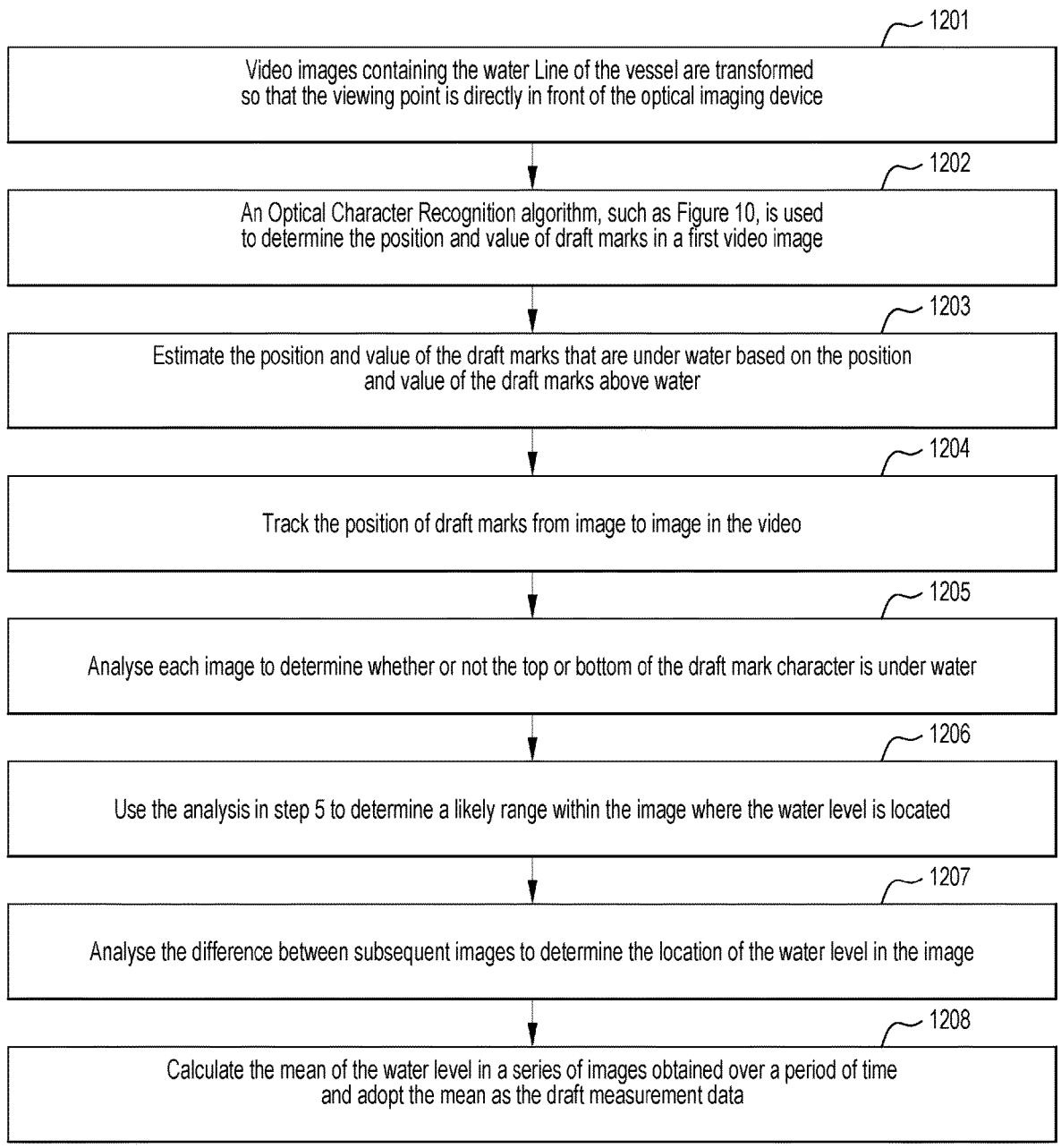
FIG. 12 illustrates a process for determining the water level in an image and for calculating the draft of a vessel.

Referring now to FIG. 12 there is illustrated a second method for determining the draft of a vessel. In particular, a machine vision algorithm is depicted in FIG. 12 that may be used to determine the water level 125 in images (and hence the draft of the vessel) by determining which draft marks are under water. In particular:

at step 1201, video images containing the water line 125 of the vessel are transformed so that the viewing point is directly in front of the optical imaging device 110 in accordance with the method discussed above;

at step 1202, an OCR algorithm is used to determine the position and value of draft marks in a first image of the video;

at step 1203, the position and value of the draft marks under water are estimated based on the position and value of the draft marks not under water;

at step 1204, the position of the draft marks is tracked from image to image in the video;

at step 1205, each image is analysed to determine whether or not the top or bottom of each draft mark character is under water (note that the top and bottom of the draft marks is used as this is the location within the image that changes the most between water being present or not, even in the case of very clear water);

at step 1206, the draft mark tops and bottoms that are under water (or not) are used to determine a likely range within the image where the water level should be (i.e. near where the draft mark top or bottom is out of the water and the top or bottom of the draft mark below is under water);

at step 1207, analyse the differences between images of the video to determine the location of the water level. A weighting may be applied to the algorithm based on the likely range detected using the draft mark top and bottoms; and at step 1208, the draft measurement is taken as the mean of the draft calculated for each of the images over a period of time (e.g. 10 seconds).

Figure 13:
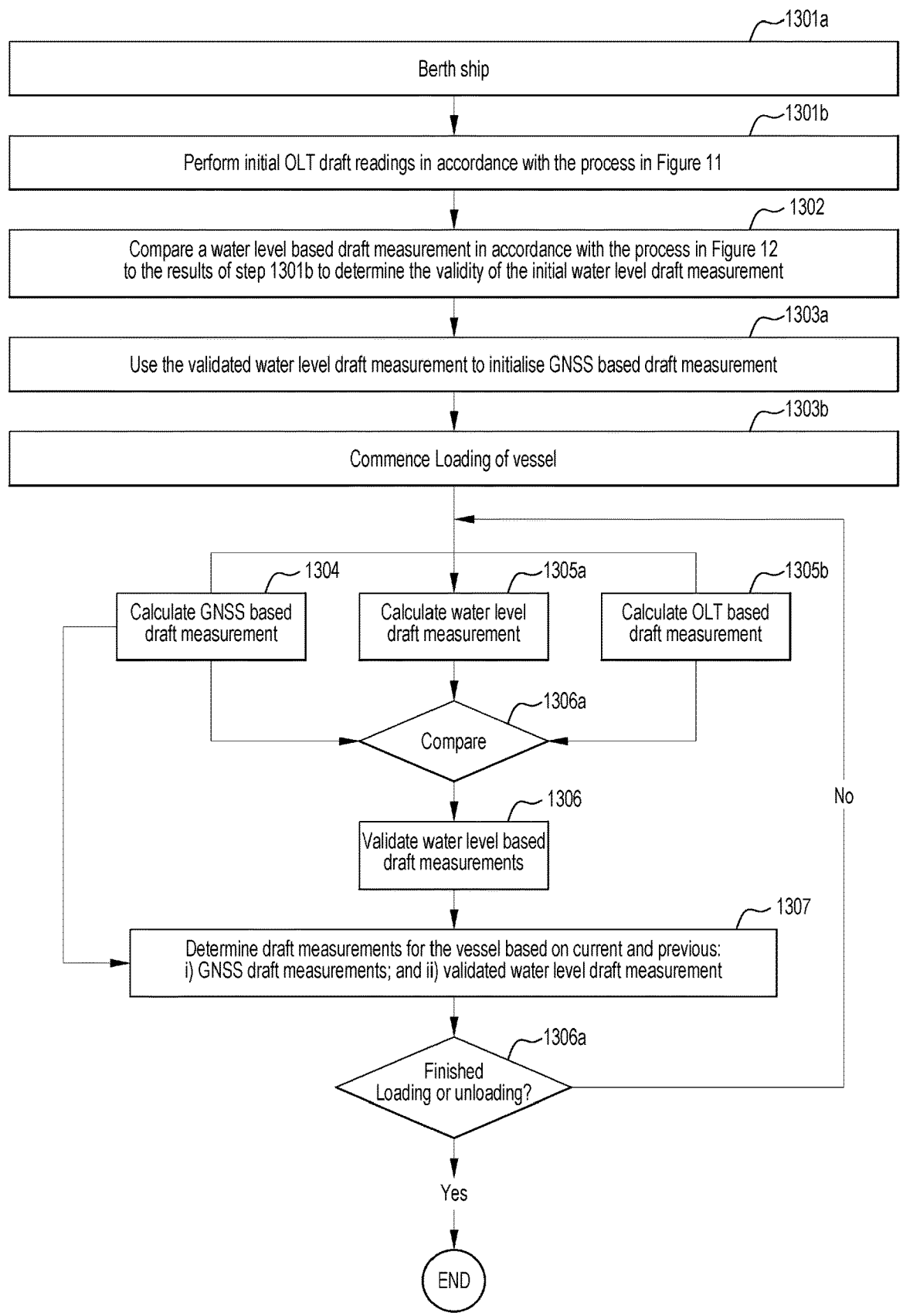
FIG. 13 illustrates a process for combining water level based draft measurements, OLT based draft measurements and GNSS based draft measurements of a vessel.

Referring now to FIG. 13, there is illustrated a process for combining the GNSS based drafts, machine vision based OLT drafts and machine vision based water level drafts to calculate a real-time draft estimate. In particular:

at step 1301, and for each wharf side draft gauge on the vessel, initial OLT draft readings in accordance with the process of FIG. 11 are taken at a number (e.g. 7) of different vertical positions along the draft marks. An algorithm is used to determine if the initial OLT drafts are valid and to calculate for each one of the draft gauges a single initial OLT draft value;

at step 1302, and for each wharf side draft gauge on the vessel, the validity of an initial water level draft in accordance with the process of FIG. 12 is confirmed by comparing it to the initial OLT draft;

at step 1303, the validated initial water level drafts are used to initialise the GNSS based drafts values;

at step 1304, GNSS based draft values are calculated throughout loading by using the change in altitude of the six GNSS sensors located on the vessel to model the change in draft of the vessel at the draft marks against the initial draft;

at step 1305, water level 125 video OLT measurements in accordance with FIG. 11, and water level draft measurements in accordance with FIG. 12, are taken throughout loading;

at step 1306, each of the water level draft measurements are compared against both the OLT draft measurements and the GNSS based draft measurements to validate the water level draft measurement; and at step 1307, determine the draft measurements of the vessel based on the current and previous validated water level drafts and GNSS based drafts.

In the process of FIG. 13, the initialisation of the GNSS based draft is continually corrected based on the validated water level drafts and if a current validated water level draft cannot be calculated, the output of the automated draft survey system is set to the GNSS based draft.

The validation of the three methods of measuring draft against each other significantly increases the integrity, robustness and accuracy compared to having only one method.

The following paragraphs provide further detail on step 1301.

The algorithm in step 1301 uses the median of the OLT draft readings that are within a configurable range of the median of all the OLT draft readings. If there are not enough readings within the configurable range then it will be considered invalid;

This method allows all the readings with the wrong metre mark value to be thrown away and not influence the result. This because a common failure mode is for the metre value to be incorrectly determined because there are typically only 3 metre marks in the image compared to approximately ten 10 cm marks.

In this specification it is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of determining the draft of a vessel comprising the steps of:

measuring the draft of the vessel using at least one optical imaging device to provide optical draft measurement data of the draft of the vessel based on an automatic detection of the position of at least one draft mark on a hull of the vessel;

using the optical draft measurement data to initialise elevation data provided by at least one GNSS or GPS device so as to provide elevation draft measurement data of the draft of the vessel; and using the elevation draft measurement data to provide at least one measurement of the draft of the vessel subsequent to the step of initialising the elevation draft measurement data.

2. The method as claimed in claim 1 wherein the step of measuring the draft of the vessel using at least one optical imaging device further comprises:

capturing an optical image of the at least one draft mark on the hull of the vessel;

performing optical character recognition (OCR) processing of the optical image to provide OCR data for the at least one draft mark; and
using the OCR data in the determination of the optical draft measurement data.

3. The method as claimed in claim 2 further comprising the steps of:
determining a location in cartesian space of the at least one draft mark; and
using the OCR data and the location in cartesian space of the at least one draft mark in the determination of optical draft measurement data for the draft of the vessel;
obtaining tide data and subtracting the tide data from the location of the draft mark in cartesian space to determine the elevation of the draft mark above the tide; and
subtracting the elevation of the draft mark above the tide from the numerical value of the draft mark so as to obtain a draft measurement of the vessel.

4. The method as claimed in claim 1 wherein the step of measuring the draft of the vessel using at least one optical imaging device comprises:
measuring a distance between at least one point on a hull of the vessel and the at least one optical imaging device; and
measuring a relative angle between first and second positions of an optical axis of the optical imaging device, wherein the first position is a predetermined position and the second position is the position of the optical imaging device when the distance between the optical imaging device and the at least one point on the hull is measured.

5. The method of claim 4 wherein the at least one optical imaging device is located on a pan and tilt platform and at least one laser distance measuring device is located adjacent the at least one optical imaging device;
and wherein the method comprises:
operating the laser distance measuring device to measure the distance between the at least one optical imaging device and said at least one point on the hull of the vessel;
and using the pan and tilt platform to move the optical imaging device to the second position and using said pan tilt platform to measure the relative angle between said first position and said second position.

6. The method as claimed in claim 5 wherein:
in the first position the optical axis of the optical imaging device is perpendicular to a longitudinal axis of a wharf on which, or adjacent to which, said optical imaging device is located;
and wherein measuring the relative angle between said first position and said second position comprises measuring the relative angle in a horizontal plane and a vertical plane.

7. The method of claim 4 comprising the step of:
using measurements of:
i) the distance between the optical imaging device and the hull; and
ii) the relative angle between the first position and second position,
to produce a three-dimensional data set of the location of at least one point on the surface of the hull at least in the vicinity of one set of draft marks.

8. The method of claim 4 comprising the step of using:
i) measurements of distance between the optical imaging device and the hull; and
ii) relative angle between the first position and the second position,
to determine the width of the hull of the vessel between corresponding draft marks on port and starboard sides of the hull of the vessel.

9. The method of claim 4 further comprising the step of transforming said image to appear as if the hull of the vessel is located in a vertical plane whereby all points on the hull of the vessel appear as if they are equidistant from the viewing point of the optical imaging device,
wherein the transform operates to transform the image to appear as if it were taken by an optical imaging device:
i) located at a view point that is:
a) perpendicular to a longitudinal axis of the wharf against which said vessel is berthed' and
b) an infinite distance from the hull of the vessel, and
ii) operating with an infinite zoom.

10. The method of claim 4 comprising the steps of:
obtaining at least one image containing at least one set of draft marks;
correcting said image for the relative angle between the second position in which said image was captured by the optical imaging device and said first position so as to produce a corrected image; and
performing optical character recognition of said corrected image.

11. The method of claim 1 wherein measuring the draft of the vessel using elevation data comprises locating at least one GNSS or GPS device on the vessel so as to measure an elevation of the vessel and thereby obtain elevation data, and using the elevation data to determine the draft of the vessel.

12. The method of claim 1 comprising the steps of:
positioning at least two GNSS or GPS devices on said vessel at positions laterally displaced relative to a longitudinal axis of said vessel;
measuring elevation data at said at least two GNSS or GPS devices; and
using the elevation data to determine an angle of list of the vessel and thereby provide angle of list data.

13. A system for determining the draft of a vessel, the system comprising:
at least one optical imaging device located on a wharf, and at least one GNSS or GPS device;
the system being adapted to:
measure the draft of the vessel using the at least one optical imaging device to provide optical draft measurement data based on an automatic detection of the position of at least one draft mark on a hull of the vessel;
use the optical draft measurement data to initialise elevation draft measurement data provided by the at least one GNSS or GPS device; and
use elevation draft measurement data to provide at least one measurement of the draft of the vessel subsequent to the step of initialising the elevation draft measurement data.

14. The system as claimed in claim 13 wherein said system further comprises a data processing unit and wherein measuring the draft of the vessel using at least one optical imaging device to provide optical draft measurement data further comprises:
capturing an optical image of the at least one draft mark on the hull of the vessel;
operating the data processing unit to perform optical character recognition (OCR) processing of the optical image so as to provide OCR data for the at least one draft mark; and said processing the OCR data to provide the optical draft measurement data.

15. The system as claimed in claim 14 further adapted to:
determine a location in cartesian space of the at least one draft mark; and
using the OCR data and the location in cartesian space of the at least one draft mark in the determination of optical draft measurement data for the draft of the vessel;
obtain tide data, and to subtract the tide data from the location of the draft mark in cartesian space so as to determine the elevation of the draft mark above the tide; and
to subtract the elevation of the draft mark above the tide from the numerical value of the draft mark so as to obtain a draft measurement of the vessel.

16. The system as claimed in claim 13 wherein measuring the draft of the vessel using at least one optical imaging device to provide optical draft measurement data further comprises:
operating a measuring device to measure a distance between at least one point on the hull of the vessel and the at least one optical imaging device; and
measuring a relative angle between first and second positions of an optical axis of an optical imaging device, wherein the first position is a predetermined position and the second position is the position of the optical imaging device when the distance between the optical imaging device and the at least one point on the hull is measured.

17. The system as claimed in claim 13 wherein further adapted to receive elevation data from at least one GNSS or GPS device located on the vessel so as to measure an elevation of the vessel, and using the elevation data to determine elevation draft measurement data of the vessel.

18. The system as claimed in claim 13 further adapted:
to receive data from at least two GNSS or GPS devices positioned on the vessel such that at least one GNSS or GPS device is located on a port side of said vessel and at least one GNSS or GPS device is located on a starboard side of said vessel, so as to provide port elevation data and starboard elevation data; and
to process the port elevation data and the starboard elevation data to determine an angle of list of the vessel and to provide angle of list data.

19. A method of determining the draft of a vessel using at least one optical imaging device comprising:
operating the optical imaging device to capture an optical image of at least one draft mark on a hull of the vessel;
performing optical character recognition (OCR) processing of the optical image to provide OCR data for the at least one draft mark;
determining a location in cartesian space of the at least one draft mark;
using the OCR data and the location in cartesian space of the at least one draft mark in the determination of optical draft measurement data for the draft of the vessel.

20. The method as claimed in claim 19 further comprising:
measuring a distance between at least one point on a hull of the vessel and the at least one optical imaging device; and
measuring a relative angle between first and second positions of an optical axis of the optical imaging device, wherein the first position is a predetermined position and the second position is the position of the optical imaging device when the distance between the optical imaging device and the at least one point on the hull is measured.

* * * * *